Oct. 10, 1933.                T. D. CRANE                1,929,838
                                SCYTHE
                         Filed April 14, 1932
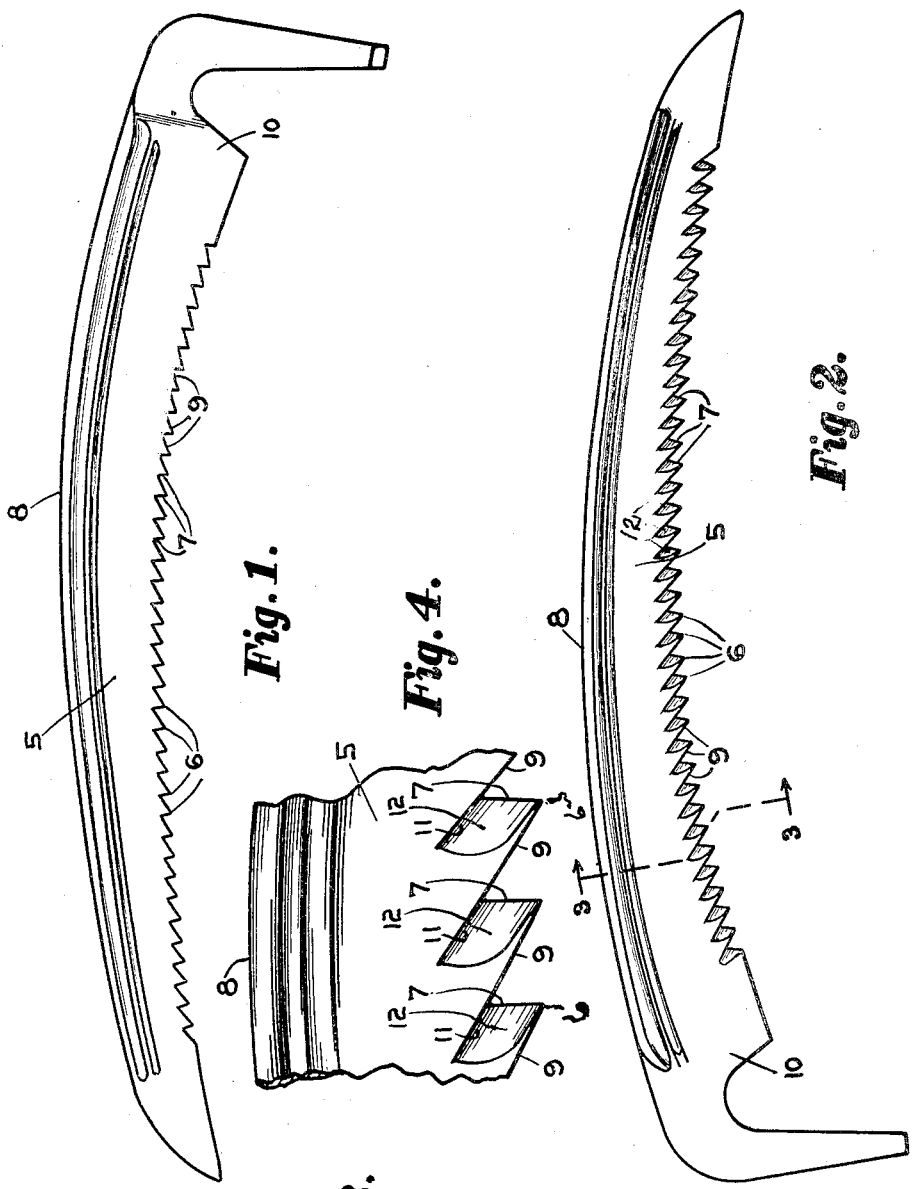
Inventor
*T. D. Crane*
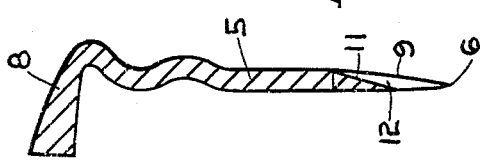
Attorney Patented Oct. 10, 1933

1,929,838

UNITED STATES PATENT OFFICE 1,929,838

SCYTHE

Theodore D. Crane, Council Bluffs, Iowa

Application April 14, 1932. Serial No. 605,282

3 Claims. (Cl. 56—326)

This invention relates to serrated blades adapted particularly for use of grass cutting tools such as scythes or sickles, and has for its primary object to provide such a construction for the blade that a lesser force or power than ordinary will be required for cutting grass or similar vegetation.

Another object is to provide a grass-cutting blade having teeth of such form that the operation of sharpening or grinding may be accomplished more conveniently and speedily than usual.

It is an object of the invention to provide outwardly convergent teeth for one edge of the blade, a recess being provided above the cutting edge of each tooth, each recess being formed in the body of the blade, in its lower side, to extend from the junction of two adjacent teeth toward the back of said blade and extending inclinedly to the cutting edge of a tooth, whereby the stalks or blades of grass to be severed may have sliding movements adjacent to the sharpened edges of the teeth as an aid to effective cutting, the stubble or grass-roots, during operation being received by the recesses and thereby tending to prevent the objectionable "bunching" of grass during operation.

The operation of parts and advantages to be derived therefrom will be fully explained herein, and with the foregoing objects in view the invention presents a new and useful construction, combination and arrangement of parts as described herein and claimed, and as illustrated in the accompanying drawing, it being understood that changes may be made in form, size, proportion and minor details, said changes being within the scope of the invention as claimed.

In the drawing, Fig. 1 is a view of the upper side of a scythe blade. Fig. 2 is a view of the lower side of the blade.

Fig. 3 is a sectional view on line 3—3 of Fig. 2.

Fig. 4 is a broken detail relating to Fig. 2, the scale being enlarged.

Referring now to the drawing for a more particular description, the invention is shown and described in connection with a scythe blade 5, its cutting edge being provided with the teeth 6.

In order that the objects of the invention may be attained as first mentioned, each tooth is provided with a rectilinear sharpened edge 7 disposed approximately at right angles to the longitudinal axis of the blade, and to the reinforcing ridge or back 8 thereof, the opposite dull or second edge 9 of each tooth having an inclination toward the heel 10 of the blade at an obtuse angle to the back 8 or longitudinal axis of the blade.

At the junction of the edges 7 and 9 of each pair of adjacently disposed teeth and extending toward the back 8 are recesses 11, each recess having a rectilinear wall 12 disposed in alignment with a dull or smooth edge 9 of a tooth.

When it is desired to sharpen the blade the flat surface of its upper side may be ground in a well known manner.

The recesses in the lower side of the blade may be considered as flat depressions, each having an inclined surface toward the cutting edge 7 of a tooth from the dull edge 9 thereof, each recess or depression having a well defined wall 11 disposed in line with an edge 9, as mentioned.

The advantages to be derived by use of the invention will be greatly appreciated. During operation, the blades of grass will be engaged only by the sharpened edges 7 of the teeth, several blades of grass during a swinging movement of the tool, being crowded between each pair of adjacently disposed teeth, and since the sharp edge 7 of each tooth is disposed at approximately a right angle to the back 8 of the blade the cutting of the stems will be effective, this being particularly noted when cutting "wire grass" or "Bermuda grass" of fine yielding texture. Since the recesses 11 terminate at each sharp edge 7 and extend toward the back of the blade beyond the junction of the edges 7 and 9 of said blades said recesses provide a slideway for the stubble or grass-roots of the severed grass, the resistance of the stubble to the swinging movement of the tool being less than ordinary. While the walls 12 of the recesses are well defined, as mentioned, they offer no resistance to the swinging movement of the tool since they are disposed in line with the dull or smooth edges 9 of the teeth.

It is obvious that the same advantages could be attained if the recesses 11 were formed in the upper side of the blade instead of the lower side, and if thus constructed the butts of the severed grass, during operation would offer less resistance for the reason that the surfaces of the recesses would have a lesser inclination than the surface of the blade if the recesses were not provided, and I do not wish to limit myself to the lower side of the blade in the formation of said recesses.

I claim as my invention,—

1. In devices for the purpose described, a scythe having one edge provided with outwardly extending teeth, each tooth having a cutting edge disposed at approximately right angles to the longitudinal axis of said scythe and having an opposing edge disposed for bracing said tooth, at an obtuse angle to said axis, said scythe being provided with recesses in one of its sides inwardly from each tooth, each recess having a surface extending inclinedly toward and terminating at the cutting edge of a tooth.

2. In devices for the purpose described, a scythe having one of its edges provided with uniformly spaced outwardly convergent teeth, each tooth having a cutting-edge and a second edge, said blade being provided in one of its sides inwardly of said teeth with recesses, each recess having a wall disposed in line with the second edge of a tooth and having a surface inclined toward and terminating at a cutting-edge of a tooth.

3. In devices for the purpose described, a scythe having an edge provided with outwardly extending teeth, each tooth having a cutting edge disposed at approximately right angles to the longitudinal axis of the scythe blade and an opposing edge disposed at an obtuse angle to said axis and a recess extending inclinedly to the cutting edge of each tooth, the said cutting edge extending outwardly in a direct line to the end of the tooth where it forms a definite angle with the end portion of said tooth.

THEODORE D. CRANE.